United States Patent
Deora et al.

(10) Patent No.: US 10,880,698 B1
(45) Date of Patent: Dec. 29, 2020

(54) PLATFORM FOR HANDLING NOTIFICATIONS IN A SMART DEVICE

(71) Applicant: Citrix Systems, Inc., Fort Lauderdale, FL (US)

(72) Inventors: Divyansh Deora, Bangalore (IN); Arnav Akhoury, Bangalore (IN); Nandikotkur Achyuth, Bangalore (IN)

(73) Assignee: Citrix Systems, Inc, Fort Lauderdale, FL (US)

( * ) Notice: Subject to any disclaimer, the term of this patent is extended or adjusted under 35 U.S.C. 154(b) by 0 days.

(21) Appl. No.: 16/570,243

(22) Filed: Sep. 13, 2019

(51) Int. Cl.
  *H04W 4/12* (2009.01)
  *H04W 4/50* (2018.01)
  *H04W 68/00* (2009.01)
  *H04L 29/08* (2006.01)

(52) U.S. Cl.
  CPC .............. *H04W 4/12* (2013.01); *H04L 67/26* (2013.01); *H04L 67/306* (2013.01); *H04W 4/50* (2018.02); *H04W 68/005* (2013.01)

(58) Field of Classification Search
  CPC ....... H04W 4/12; H04W 68/005; H04W 4/50; H04L 67/26; H04L 67/306
  See application file for complete search history.

(56) References Cited

U.S. PATENT DOCUMENTS

| 7,457,879 | B2 * | 11/2008 | Horvitz | G06Q 10/107 706/46 |
| 2012/0166284 | A1 * | 6/2012 | Tseng | G06Q 30/0273 705/14.58 |
| 2014/0180978 | A1 * | 6/2014 | Martinez | H04L 63/302 706/12 |
| 2018/0219824 | A1 * | 8/2018 | Laller | G06F 3/04842 |

* cited by examiner

*Primary Examiner* — Julio R Perez
(74) *Attorney, Agent, or Firm* — Hoffman Warnick LLC

(57) ABSTRACT

A system, method and program product for managing notifications on a smart device. A disclosed system includes: an application (App) interface layer that interfaces with Apps residing on the smart device and intercepts notifications generated by the Apps; and a notification processing system that includes: a data collection module that collects contextual data, behavioral data, and collaborative data; a profile builder that builds and updates a dynamic user profile based on data collected by the data collection module; and a notification analyzer that analyzes each intercepted notification relative to the dynamic user profile, calculates a probability score of a user response to each intercepted notification, and determines whether to output each intercepted notification to a user via a user interface based on the probability score.

17 Claims, 3 Drawing Sheets

PLATFORM FOR HANDLING NOTIFICATIONS IN A SMART DEVICE

BACKGROUND OF THE DISCLOSURE

A significant advantage of many smart devices, such as smartphones, Internet of Things (IoT) appliances, autonomous vehicles, etc., is that they provide a platform in which native and third party applications (Apps) can be easily loaded, configured and run. This flexibility for example allows a user to personalize their experience when interfacing with such a device. In the case of smartphones, users rely on such Apps in their daily lives to enhance productivity, connectivity, entertainment, etc.

While App based platforms add tremendous value to the user experience, the use of modern day Apps are not without some drawbacks. One such challenge is the volume of "push" notifications that are presented to the user (e.g., arrival of a new email, a promotional message, a weather update, a social media update, a game status, etc.). Even a modest smartphone user will be subject to a continuous stream of notifications that are generated by Apps and associated services. While the user has some limited control over the presentation of notifications in their device settings, control over notifications tends to be an "all or nothing" proposition for each App on the device. Assuming a user opts in to receive notifications for a given App, it is the App, rather than the user, that controls the frequency and content of notifications.

BRIEF DESCRIPTION OF THE DISCLOSURE

Aspects of this disclosure provide a system, method and program product for managing notifications on a smart device.

A first aspect of the disclosure provides a system for managing notifications on a smart device. The system includes: an application (App) interface layer that interfaces with Apps residing on the smart device to intercept notifications generated by the Apps; and a notification processing system. The notification processing system includes a data collection module that collects contextual data, behavioral data, and collaborative data, and a profile builder that builds and updates a dynamic user profile based on data collected by the data collection module. Also included is a notification analyzer that analyzes each intercepted notification relative to the dynamic user profile, calculates a probability score of a user response to each intercepted notification, and determines whether to output each intercepted notification to a user via a user interface based on the probability score.

A second aspect of the disclosure provides a method for managing notifications on a smart device. The method includes collecting and storing contextual data, behavioral data, and collaborative data; and updating a dynamic user profile based on collected data. Further steps include: intercepting notifications generated by Apps on the smart device; analyzing each intercepted notification relative to the dynamic user profile to calculate a probability score of a user response for each intercepted notification; and determining whether to output each intercepted notification to a user via a user interface based on the probability score.

A third aspect of the disclosure provides a computer program product stored on a computer readable storage medium, which when executed by a computing system, handles notifications in a smart device. The computer program product includes program code that interfaces with Apps residing on the smart device and intercepts notifications generated by the Apps. Also provided is program code that collects contextual data, behavioral data, and collaborative data; program code that builds and updates a dynamic user profile based on collected data; and program code that analyzes each intercepted notification relative to the dynamic user profile, calculates a probability score of a user response to each intercepted notification, and determines whether to output each intercepted notification to a user via a user interface based on the probability score.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for enhancing the handling of notifications on a smart device. In one embodiment, individual notifications are filtered based on a calculated probability of how the user will respond to the notification. Probability is based on a number of collected data points including user contextual data, external contextual data, historical user behavior data, and collaborative behaviors of other users.

Figure 1:
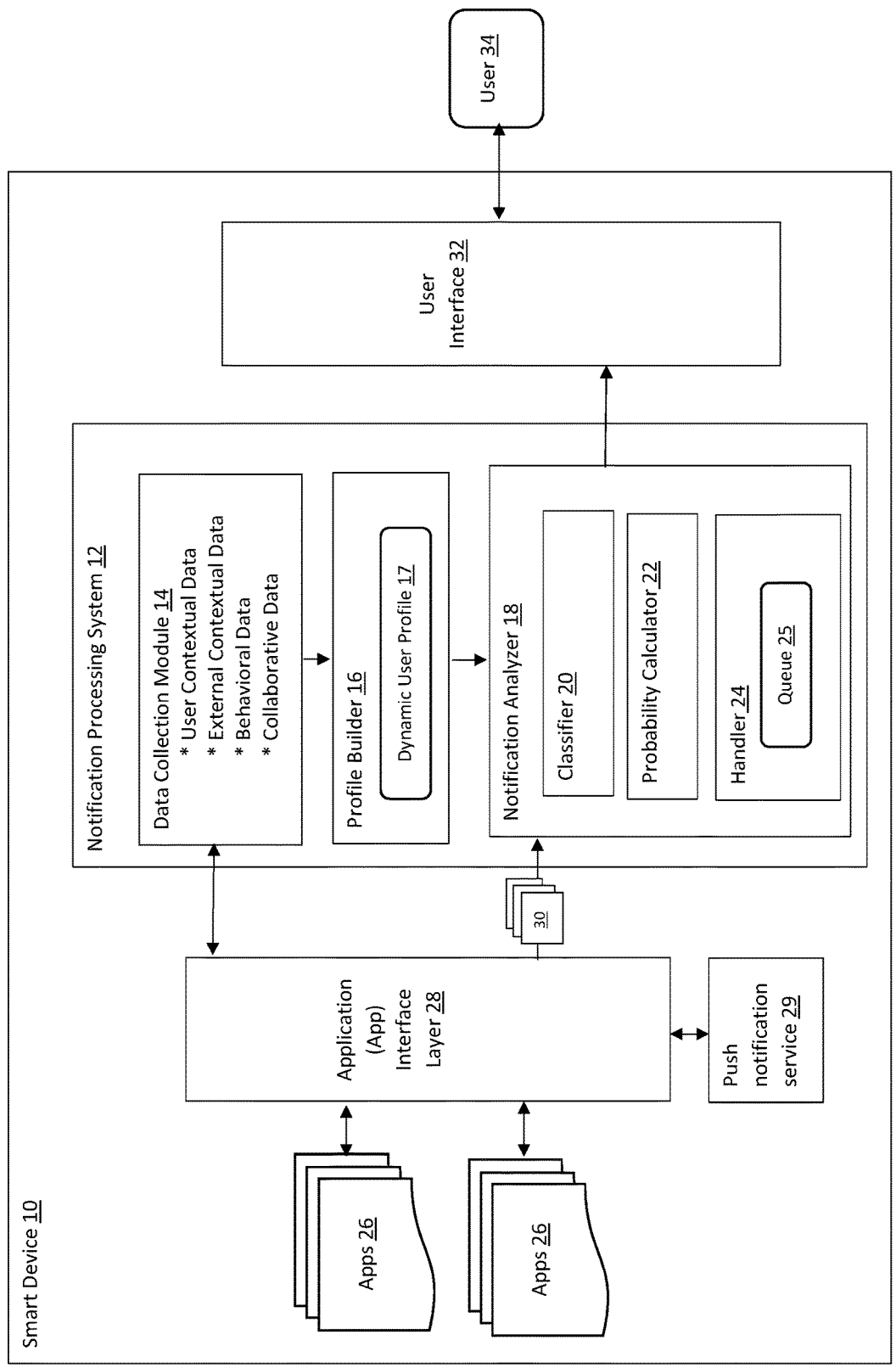
FIG. 1 depicts a smart device having a system for handling App notifications, in accordance with an illustrative embodiment.

Referring to FIG. 1, an illustrative smart device 10 is shown having a system for handling notifications, in particular notifications generated by Apps 26 and their associated services. Apps 26 may include programs delivered with the smart device 10 as well as downloaded programs. The system for handling notifications generally includes: an application (App) interface layer 28 and a notification processing system 12. App interface layer 28 may for example be integrated with the operating system of the smart device 10 to access and control Apps 26. In particular, App interface layer 28 contains logic to intercept notifications 30 generated by the Apps 26 before the notifications 30 are presented to the user 34 via user interface 32. Notifications 30 may for example be captured by interfacing with a push notification service 29 used on the device 10. Illustrative services may include Apple Push Notification service (APNs), Google Cloud to Device Messaging (C2DM), Amazon Simple Notification Service, etc.

Notifications 30 may include local notifications and/or remote notifications. Local notifications generally include notifications that are triggered by routines written within an App (e.g., a calendar event reminder, received SMS message, etc.). Remote notifications include notifications generated via an external server or service association with an App, e.g., a marketing service that sends coupons to promote new restaurants via YELP® mobile App.

After a notification 30 is intercepted by App interface layer 28, notification processing system 12 determines how to handle the notification, e.g., filter, save for later, output, further process, sort, etc. Notification processing system 12 generally includes: a data collection module 14 that collects various types of contextual, behavioral, and collaborative data; a profile builder 16 that builds and updates a dynamic user profile 17 based on the collected data; and a notification analyzer 18 that analyzes each intercepted notification 30 relative to the dynamic user profile 17 to determine how to handle the notification. In particular, notification analyzer 18 predicts a probability of how the user 34 will respond to the notification, e.g., ignore, read with low importance, read with high importance, respond immediately, respond later, save, etc.

Data collection module 14 continuously or periodically collects various types of data, including: user contextual data such as location, date, time, calendar events, user demographics, etc.; external contextual data such as news events, weather, social media posts, government issued alerts, etc.; behavioral data such as how the user 34 previously responded to similar notification scenarios; and collaborative data that captures how other similar users responded to similar notification scenarios. Collaborative data is collected based on the assumption that groups of users who have acted a certain way in the past will act similarly in the future, i.e. a cluster of like-minded users under similar circumstances with likely react similarly to a given notification. In one illustrative embodiment, collaborative data comprises a similarity score between the user 34 and one more defined user clusters. For instance, the user 34 can be compared to one or more defined user clusters using a k-NN approach, to find a nearest neighbor.

Profile builder 16 uses the collected data to build the dynamic user profile 17, which is regularly updated as new data is collected. The dynamic user profile 17 may be implemented in the form of weighted vectors, where weights themselves are variable, e.g., the weights may be evaluated over time to ascertain which are more relevant. For example, a weighted vector may be of the form:

Profile: User A
   User location History=w1*(location a, location b, location c)
   Current Time=w2*(time, date)
   User Demographics=w3*(age, address)
   Notification Scenario 1=w4*(response type a, response type b)
   Notification Scenario 2=w5*(response type c)
   Calendar Events=w6*(event record)
   Weather=w7*(current weather)
   User Cluster 1=w8*(similarity score)
   User Cluster 2=w9*(similarity score)

Where wN are weights assigned to each vector. A machine learning system may be utilized to adjust the weights of the vector over time, e.g., to ascertain which factors are most relevant for the user. It is understood that the above vector is a simple example and more complex vectors may be implemented.

When a notification 30 is intercepted, the notification 30 is redirected to the notification analyzer 18, which includes: a classifier 20 that characterizes the purpose of the notification 30; a probability calculator 22 that analyzes the notification 30 relative to the dynamic user profile 17 to determine a probable response of the user 34; and a handler 24 that determines what to do with the notification 30 based on the calculated probability or probabilities. Classifying the notification 30 to capture its intended purpose may for example be based on the App 26 that issued the notification 30, based on a comparison with prior notifications, using natural language processing, or any other means. The intended purpose may for example be classified according to a predetermine taxonomy or categorization. For example, a received notification may be classified using a hierarchy such as: marketing/food/restaurant/offer, work/email/customer/complaint, gaming/puzzle/your_move, etc. Once classified by classifier 20, the notification 30 can be analyzed by the probability calculator 22 relative to the weighted vectors of the dynamic user profile 17 to determine a probable reaction of the user 34. In one illustrative embodiment, a weighted Bayesian classification can be used to estimate the probability of a user reaction (e.g., like 60%, ignore 28%, respond 44%, etc.) given the present user circumstances captured in the dynamic user profile 17. For instance, if the user's geolocation and time of day places the user 34 at the gym where in the past the user does not react to any notifications, the probability score that the user 34 will respond to a notification of a work email will be low.

Based on the probability calculation, handler 24 will determine whether the notification 30 should be immediately output to the user 34 via the user interface 32, filtered/deleted, saved for later presentation, further processed, etc. For example, in the above scenario where user 34 is at the gym, there may be a high probability that the user will respond to the notification later in the day, so the notification 30 may be held in a queue 25 for later display. In the case where there are a large number of notifications 30 stored in queue 25, notifications 30 can be scored and/or sorted to identify the most relevant notifications, which can be outputted at an appropriate time, while the lower scoring notifications can be filtered. Because the dynamic user profile 17 is regularly updated, the probability score for the same notification can change over time. Thus, this system ensures that the user 34 will be presented with notifications based on the current circumstance of the user in a smart and contextual manner.

Figure 2:
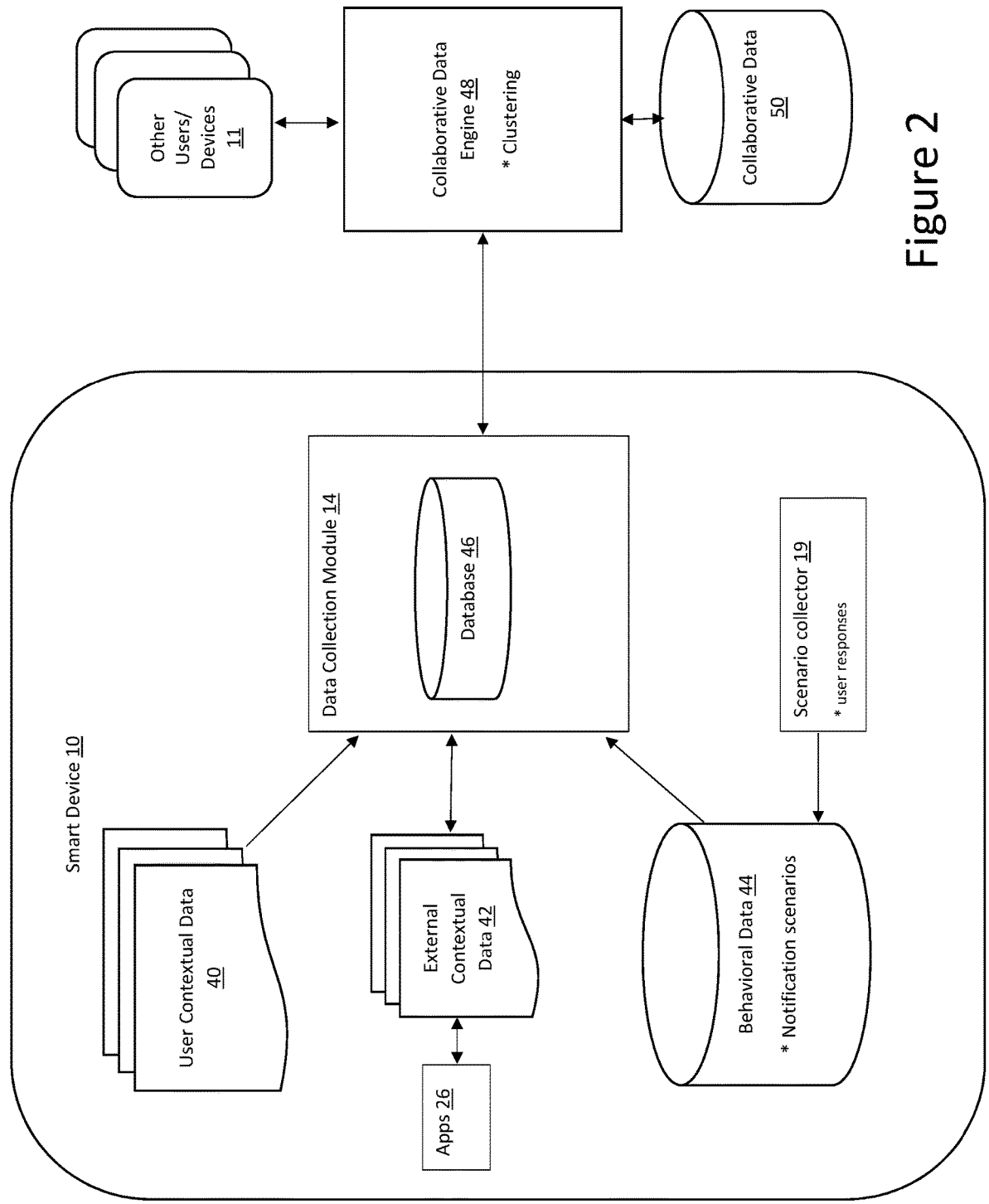
FIG. 2 depicts a data collection module on the smart device of FIG. 1, in accordance with an illustrative embodiment.

FIG. 2 depicts a more detailed view of the operation of data collection module 14 within the context of smart device 10. As previously noted, data collection module 14 is configured to capture and store various types of collected data. In this illustrative embodiment, collected data is stored in database 46 that includes user contextual data 40, external contextual data 42, behavioral data 44 and collaborative data 50. User contextual data 40 generally comprises data that can be directly collected from storage or systems on the smart device 10, e.g., time, location, calendar invites, user demographics, etc. External contextual data 42 generally comprises data captured from an external resource through an App 26 (e.g., via App interface layer 28), e.g., current weather, news, government alerts, social media content, etc. Behavioral data 44 generally comprises historical notification scenarios and responses by the user 34, e.g., when presented with scenario A, the user 34 ignored the notification; when presented with scenario B, the user 34 immediately opened the notification, etc. A scenario collector 19 may be employed to collect and store user responses to notification scenarios. Collaborative data 50 generally comprises information derived from a superset of behavioral data from other users/devices 11. In one embodiment, a collaborative data engine 48 collects behavioral data, and then clusters or models users with similar behavior patterns. Using, e.g., a k-NN approach, a nearest cluster for the user 34 can be determined. The behavior data for the nearest cluster can then be used to help predict future behaviors of the user 34.

Figure 3:
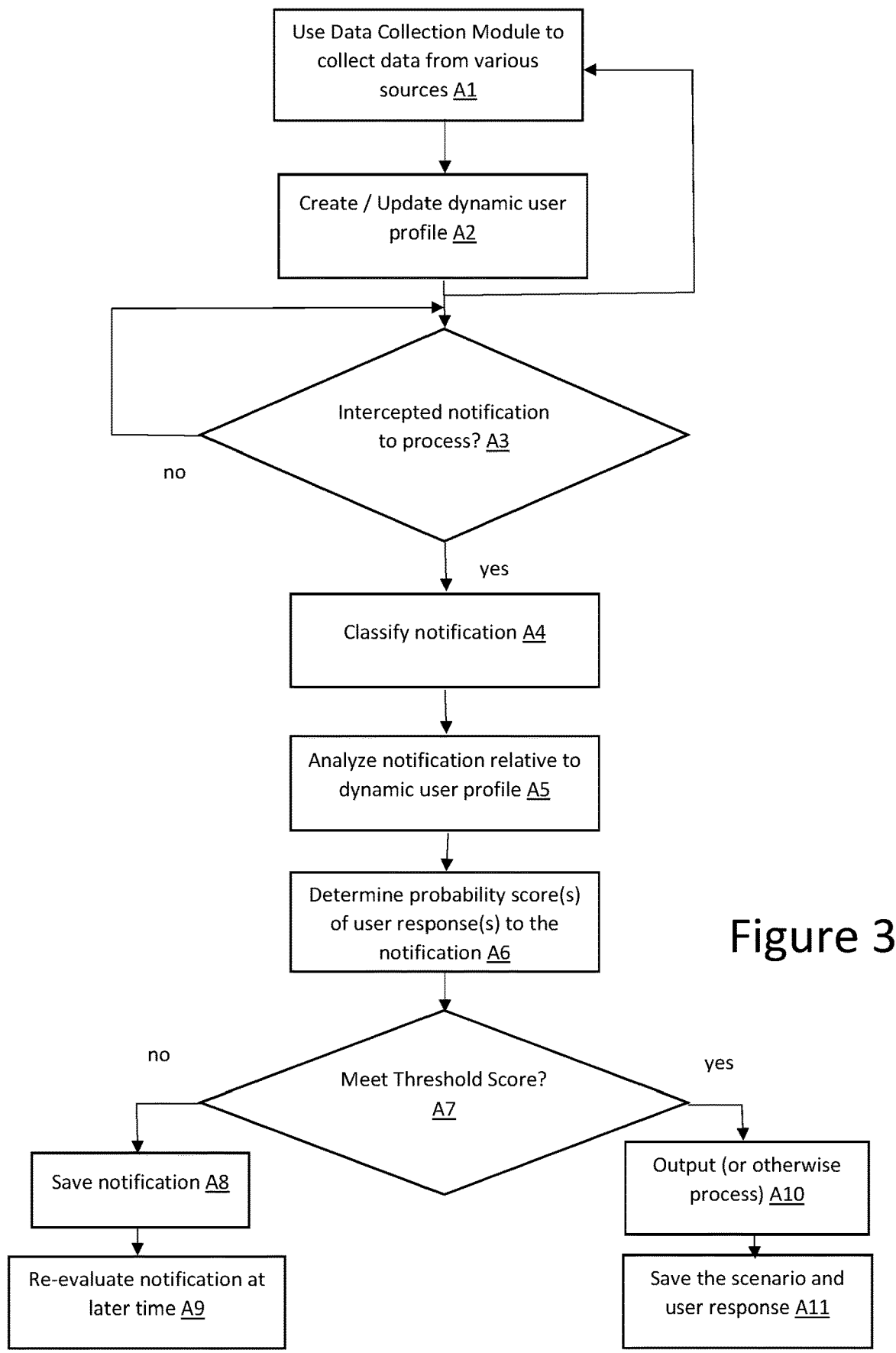
FIG. 3 depicts a flow diagram of a process for handling notifications, in accordance with an illustrative embodiment.

FIG. 3 depicts an illustrative process for implementing notification handling. Data collection module 14 collects data from various sources at A1, and at A2 the dynamic user profile 17 is created or updated based on the collected data. The collection of data and updating of the dynamic user profile 17 repeats regularly. At A3, a determination is made whether there is an intercepted notification 30 to process. If no, the process periodically rechecks for notifications at A3. If yes at A3, then the notification 30 is classified at A4, e.g., using a formal structure that captures the purpose of the notification. At A5, the classified notification is analyzed relative to the dynamic user profile 17 and at A6, a probability score (or set of scores) is determined for how the user will respond to the notification 30. At A7, the probability score is compared to a threshold score and if the score is met, the notification 30 is outputted (or otherwise processed, e.g., sorted, queued, scheduled for later release, etc.) at A10. At A11 the notification scenario and user response are captured and stored as behavioral data.

If the threshold score is not met at A7, the notification is saved at A8, and re-evaluated at a later time (e.g., one hour later, one day later, etc.) at A9. Thus, if the context associated with the notification becomes favorable at a later time, it can be automatically released at that time. In a further embodiment, an interface can be provided through which the user can view all such notifications and choose to, e.g., manually delete them, release or mark them as useful for future reference, etc. The interface can also allow the user to set policies, such as auto delete notifications that never meet the threshold for some period of time, e.g., x days.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Smart device 10 (FIG. 1) may comprise any type of computing device that for example includes at least one processor, memory, an input/output (I/O), e.g., one or more I/O interfaces and/or devices, and a communications pathway or bus. In general, the processor(s) execute program code which is at least partially fixed in memory. While executing program code, the processor(s) can process data, which can result in reading and/or writing transformed data from/to memory and/or I/O for further processing. The pathway provides a communications link between each of the components in the computing device. I/O can comprise one or more human I/O devices, which enable a user to interact with the computing device and the computing device may also be implemented in a distributed manner such that different components reside in different physical locations.

Aspects of the notification handling system described herein may for example be implemented by a cloud computing environment that employs a network of remote, hosted servers to manage, store and/or process data, and may generally be referred to, or fall under the umbrella of, a "network service." The cloud computing environment may include a network of interconnected nodes, and provide a number of services, for example hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-premises computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-premises computing environments in a hybrid configuration.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for managing notifications on a smart device, comprising:
   an application (App) interface layer that interfaces with Apps residing on the smart device and intercepts notifications generated by the Apps; and
   a notification processing system that includes:
      a data collection module that collects contextual data, behavioral data, and collaborative data, wherein the data collection module stores behavioral data that includes different notification scenarios previously presented to a user and user responses to the different notification scenarios;
      a profile builder that builds and updates a dynamic user profile based on data collected by the data collection module, wherein the dynamic user profile is regularly updated based on user responses to prior notifications; and
      a notification analyzer that analyzes each intercepted notification relative to the dynamic user profile, calculates a probability score of a user response to each intercepted notification, and determines whether to output each intercepted notification to a user via a user interface based on the probability score.

2. The system of claim 1, wherein the notification analyzer further includes a queue for storing notifications.

3. The system of claim 1, wherein the contextual data includes user contextual data having at least one of: time, location and user calendar data.

4. The system of claim 1, wherein the contextual data includes external contextual data having at least one of: user email data, user text data, news, weather, social media content and government alerts.

5. The system of claim 1, wherein the collaborative data is generated by a collaborative data engine that determines a group of users most similar to the user.

6. The system of claim 1, wherein the dynamic user profile includes a vector of weighted values and the probability score is calculating by analyzing an intercepted notification relative to the vector using a Bayesian classification algorithm.

7. A method for managing notifications on a smart device, comprising:
   collecting and storing behavioral data, wherein the behavioral data includes different notification scenarios previously presented to a user and user responses to the different notification scenarios on the smart device;
   updating a dynamic user profile based on collected data, wherein the dynamic user profile is regularly updated based on user responses to prior notification scenarios;
   intercepting notifications generated by Apps on the smart device;
   analyzing each intercepted notification relative to the dynamic user profile to calculate a probability score of a user response for each intercepted notification; and
   determining whether to output each intercepted notification to a user via a user interface based on the probability score.

8. The method of claim 7, further comprising determining whether to store each intercepted notification in a queue.

9. The method of claim 7, further comprising collecting contextual data, wherein the contextual data includes user contextual data having at least one of: time, location and user calendar data.

10. The method of claim 9, wherein the contextual data includes external contextual data having at least one of: user email data, user text data, news, weather, social media content and government alerts.

11. The method of claim 7, further comprising collecting collaborative data, wherein the collaborative data is generated by a collaborative data engine that determines a group of users most similar to the user.

12. The method of claim 7, wherein the dynamic user profile includes a vector of weighted values and the probability score is calculating by analyzing an intercepted notification relative to the vector using a Bayesian classification algorithm.

13. A computer program product stored on a computer readable storage medium, which when executed by a computing system, handles notification in a smart device, wherein the computer program product comprises:
   program code that interfaces with Apps residing on the smart device and intercepts notifications generated by the Apps;
   program code that collects behavioral data, and collaborative data, wherein the behavioral data includes different notification scenarios previously presented to a user and user responses to the different notification scenarios on the smart device;
   program code that builds and updates a dynamic user profile based on collected data, wherein the dynamic user profile is regularly updated based on user responses to prior notification scenarios; and
   program code that analyzes each intercepted notification relative to the dynamic user profile, calculates a probability score of a user response to each intercepted notification, and determines whether to output each intercepted notification to a user via a user interface based on the probability score.

14. The program product of claim 13, further comprising a queue for storing notifications.

15. The program product of claim 13, further comprising program code for collecting contextual data, wherein the contextual data includes at least one of: time, location, user calendar data, user email data, user SMS data, news, weather, social media content and government alerts.

16. The program product of claim 13, wherein the collaborative data is generated by a collaborative data engine that determines a group of users most similar to the user.

17. The program product of claim 13, wherein the dynamic user profile includes a vector of weighted values and the probability score is calculating by analyzing an intercepted notification relative to the vector using a Bayesian classification algorithm.

\* \* \* \* \*